(12) United States Patent
Kawabe et al.

(10) Patent No.: US 10,723,135 B2
(45) Date of Patent: Jul. 28, 2020

(54) INK JET RECORDING METHOD AND INK JET RECORDING APPARATUS

(71) Applicant: CANON KABUSHIKI KAISHA, Tokyo (JP)

(72) Inventors: Minako Kawabe, Koganei (JP); Kouhei Nakagawa, Tokyo (JP); Hideyuki Saito, Saitama (JP); Yoshihide Aikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/158,400

(22) Filed: Oct. 12, 2018

(65) Prior Publication Data
US 2019/0111704 A1    Apr. 18, 2019

(30) Foreign Application Priority Data

Oct. 17, 2017  (JP) .................................. 2017-201261
Sep. 26, 2018  (JP) .................................. 2018-180360

(51) Int. Cl.

| C09D 11/322 | (2014.01) |
| C09D 11/40 | (2014.01) |
| B41J 2/165 | (2006.01) |
| B41J 2/21 | (2006.01) |
| B41J 2/17 | (2006.01) |
| C09D 11/32 | (2014.01) |

(52) U.S. Cl.
CPC ............. B41J 2/2107 (2013.01); B41J 2/165 (2013.01); B41J 2/16517 (2013.01); B41J 2/16588 (2013.01); B41J 2/17 (2013.01); C09D 11/32 (2013.01); C09D 11/322 (2013.01); C09D 11/40 (2013.01); B41J 2002/16502 (2013.01)

(58) Field of Classification Search
CPC .................... B41J 25/001; B41J 25/003; B41J 2002/1437; B41J 2002/14379; B41J 2002/14387
See application file for complete search history.

(56) References Cited

U.S. PATENT DOCUMENTS

| 7,208,033 B2 | 4/2007 | Kawabe et al. |
| 7,244,299 B2 | 7/2007 | Tsuji et al. |
| 7,285,159 B2 | 10/2007 | Aikawa et al. |
| 7,294,184 B2 | 11/2007 | Fujimoto et al. |
| 7,381,257 B2 | 6/2008 | Takayama et al. |
| 7,445,325 B2 | 11/2008 | Aikawa et al. |

(Continued)

FOREIGN PATENT DOCUMENTS

| JP | 2005-342982 A | 12/2005 |
| JP | 2008-023989 A | 2/2008 |

*Primary Examiner* — Scott A Richmond
(74) *Attorney, Agent, or Firm* — Venable LLP

(57) ABSTRACT

The ink jet recording method, which uses an ink jet recording apparatus, including: a first ink and a second ink containing a pigment; and a recording head having an ejection orifice surface in which a first ejection orifice array for ejecting the first ink and a second ejection orifice array for ejecting the second ink are formed, wherein the first ejection orifice array and the second ejection orifice array are sequentially arranged from the bottom in the direction of gravity to be adjacent to each other and arranged to at least partially overlap each other, includes: a recording step, wherein a true specific gravity of the pigment in the first ink is smaller than a true specific gravity of the pigment in the second ink.

13 Claims, 5 Drawing Sheets

(56) References Cited

U.S. PATENT DOCUMENTS

| | | |
|---|---|---|
| 7,615,113 B2 | 11/2009 | Aikawa et al. |
| 7,618,484 B2 | 11/2009 | Fujimoto et al. |
| 7,705,071 B2 | 4/2010 | Nakagawa et al. |
| 7,909,448 B2 | 3/2011 | Iwata et al. |
| 8,025,722 B2 | 9/2011 | Kawabe et al. |
| 8,070,871 B2 | 12/2011 | Kawabe et al. |
| 2004/0027415 A1* | 2/2004 | Yamashita ............... B41J 2/165 347/37 |
| 2008/0136875 A1* | 6/2008 | Iwata .................... B41J 2/2107 347/85 |
| 2012/0218335 A1* | 8/2012 | Kondo ................. B41J 2/2132 347/13 |
| 2019/0329560 A1* | 10/2019 | Kunifuji ............. B41J 2/17523 |

* cited by examiner

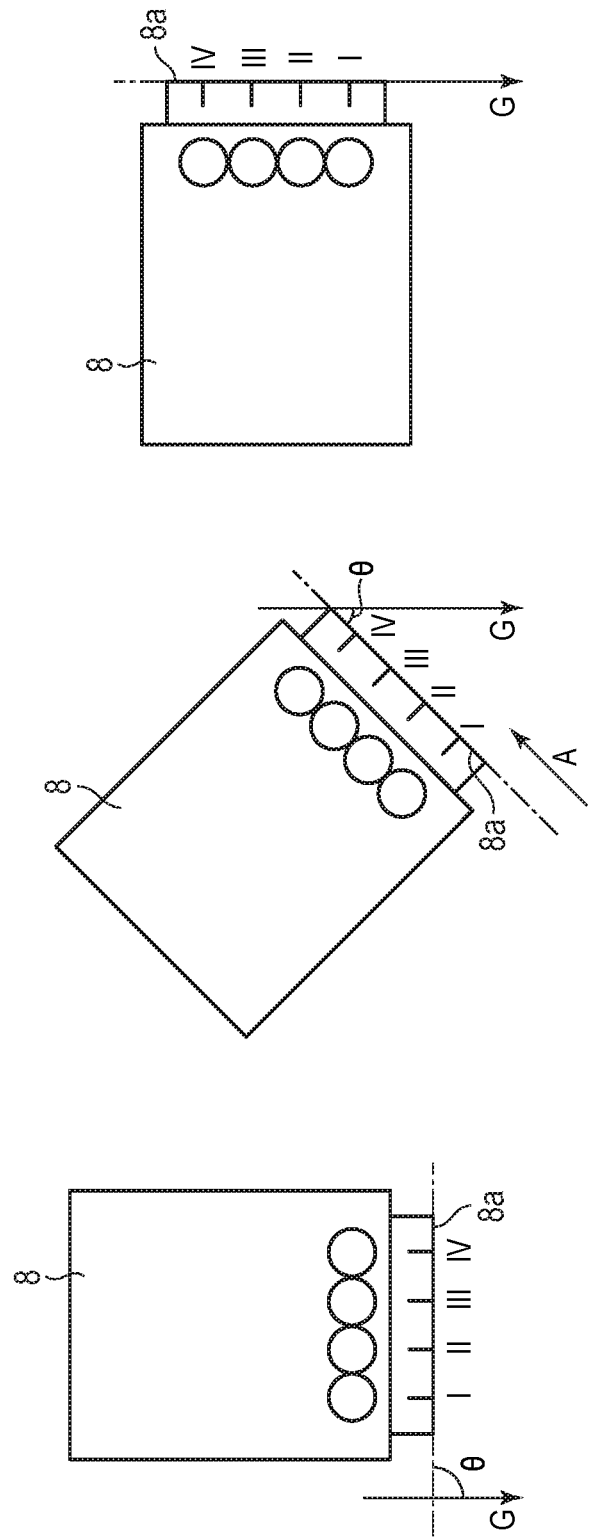

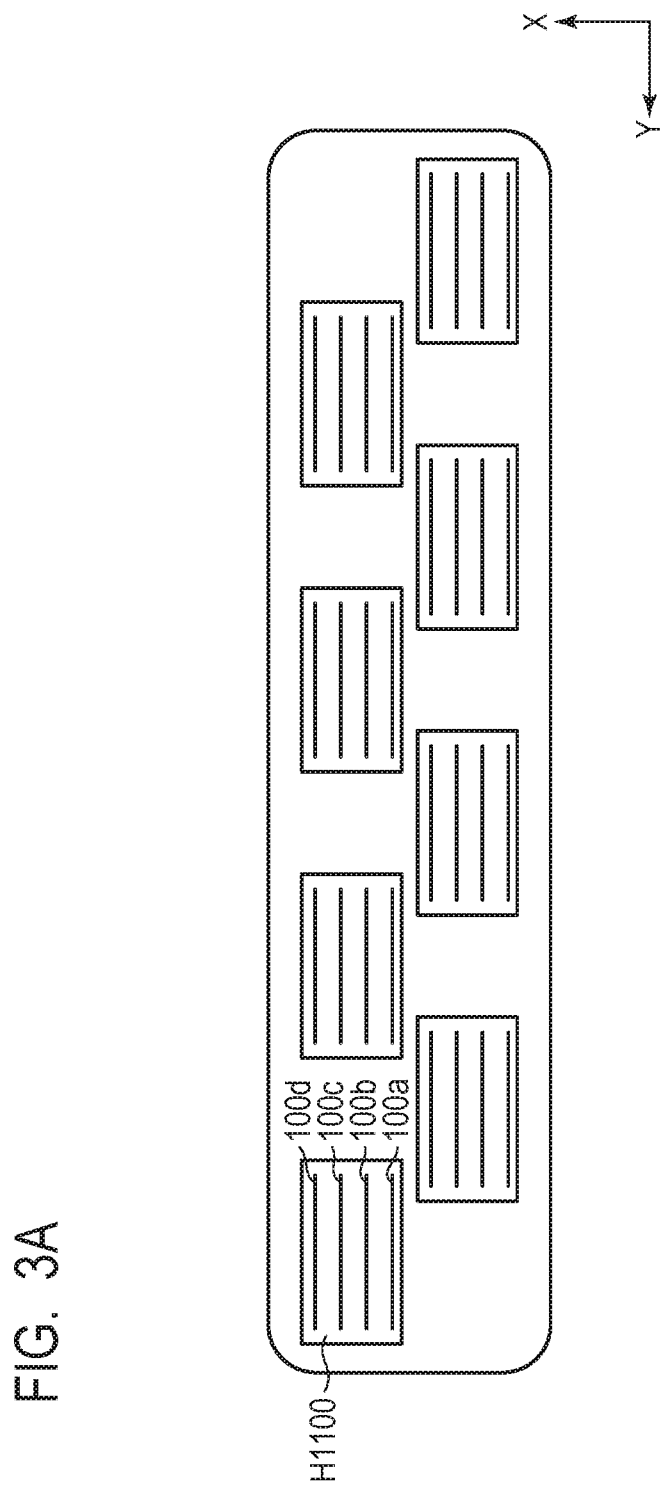

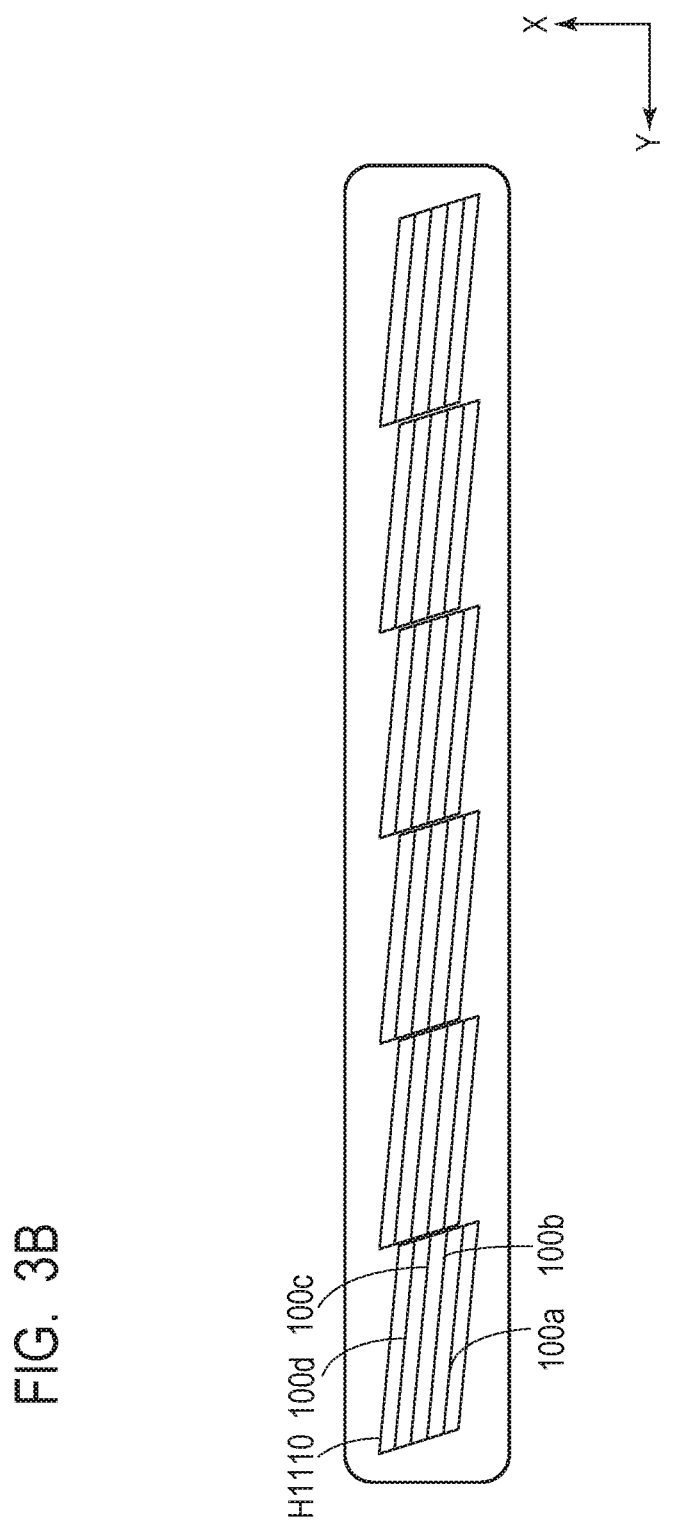

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

Recently, an opportunity to use an ink jet recording apparatus in a commercial printing field and an office printing field has increased. In the commercial printing field and the office printing field, miniaturization of the ink jet recording apparatus is required. In order to miniaturize the apparatus, it has been studied to shorten a conveying distance of a recording medium by using a recording head in which an ejection orifice surface of the recording head is inclined with respect to the direction of gravity (see Japanese Patent Application Laid-Open No. 2005-342982). Further, it has been studied to use a recording head having plurality of ejection orifice arrays for ejecting a plurality of inks instead of using a plurality of recording heads corresponding to the plurality of inks such as cyan, magenta, yellow, and black (see Japanese Patent Application Laid-Open No. 2008-023989).

In general, even when the inks ejected from the recording head are mixed, it is possible to eject ink which is not mixed when recording an image by discharging the mixed color ink by a recovery operation such as preliminary ejection or suction. However, in order to reduce an amount of waste ink ejected by a recovery operation, it is important to be able to eject ink which is not mixed in color even if the number of recovery operations is small. As described above, an ability to eject the ink which is not mixed in color with the small number of recovery operations is called color mixing recoverability. The present inventors conducted a study using a recording head having the plurality of ejection orifice arrays for ejecting the plurality of inks while an ejection orifice surface of the recording head is inclined with respect to the direction of gravity. As a result, it was found that when ink is ejected from the recording head, the ink tends to be mixed in color, and thus the color mixing recoverability of the ink may be insufficient in some cases.

SUMMARY OF THE INVENTION

An object of the present invention is to provide an ink jet recording method in which color mixing recoverability of ink is excellent even in a case in which the ink is ejected from a recording head inclined with respect to the direction of gravity and having a plurality of ejection orifice arrays for ejecting a plurality of inks. Another object of the present invention is to provide an ink jet recording apparatus using the ink jet recording method.

According to an embodiment of the present invention, there is provided an ink jet recording method using an ink jet recording apparatus including: a first ink and a second ink which are aqueous inks containing a pigment; and a recording head having an ejection orifice surface in which a first ejection orifice array for ejecting the first ink and a second ejection orifice array for ejecting the second ink are formed, wherein the first ejection orifice array and the second ejection orifice array are sequentially arranged from the bottom in the direction of gravity to be adjacent to each other and arranged to at least partially overlap each other in a conveying direction of a recording medium, the ink jet recording method including: a recording step of ejecting the aqueous ink from the recording head disposed so that an angle formed between the ejection orifice surface of the recording head and the direction of gravity is 0° or more to less than 90° to record an image on the recording medium, wherein a true specific gravity of the pigment in the first ink is smaller than a true specific gravity of the pigment in the second ink.

According to another embodiment of the present invention, there is provided an ink jet recording apparatus including: a first ink and a second ink which are aqueous inks containing a pigment; and a recording head having an ejection orifice surface in which a first ejection orifice array for ejecting the first ink and a second ejection orifice array for ejecting the second ink are formed, wherein the first ejection orifice array and the second ejection orifice array are sequentially arranged from the bottom in the direction of gravity to be adjacent to each other and arranged to at least partially overlap each other in a conveying direction of a recording medium, wherein the aqueous ink is ejected from the recording head disposed so that an angle formed between the ejection orifice surface of the recording head and the direction of gravity is 0° or more to less than 90° to record an image on the recording medium, and a true specific gravity of the pigment in the first ink is smaller than a true specific gravity of the pigment in the second ink.

According to the present invention, it is possible to provide an ink jet recording method and an ink jet recording apparatus, in which color mixing recoverability of ink is excellent even in a case in which the ink is ejected from a recording head inclined with respect to the direction of gravity and having a plurality of ejection orifice arrays for ejecting a plurality of inks.

Further features of the present invention will become apparent from the following description of exemplary embodiments with reference to the attached drawings.

BRIEF DESCRIPTION OF THE DRAWINGS

FIG. 1A, which is a view illustrating a relationship between an ejection orifice surface of a recording head and the direction of gravity, is a view illustrating a case in which an angle formed between the ejection orifice surface of the recording head and the direction of gravity is 90°.

FIG. 1B, which is a view illustrating a relationship between an ejection orifice surface of a recording head and the direction of gravity, is a view illustrating a case in which an angle formed between the ejection orifice surface of the recording head and the direction of gravity is 45°.

FIG. 1C, which is a view illustrating a relationship between an ejection orifice surface of a recording head and the direction of gravity, is a view illustrating a case in which an angle formed between the ejection orifice surface of the recording head and the direction of gravity is 0°.

FIG. 3A, which is a view schematically illustrating an example of a line head, is a schematic view of a line head in which the recording element substrates are arranged in a zigzag shape (non-adjacent arrangement) in an arrangement direction of a plurality of ejection orifice arrays.

FIG. 3B, which is a view schematically illustrating an example of a line head, is a schematic view of a line head in which the recording element substrates are arranged in a linear shape (adjacent arrangement).

DESCRIPTION OF THE EMBODIMENTS

Figure 2A:
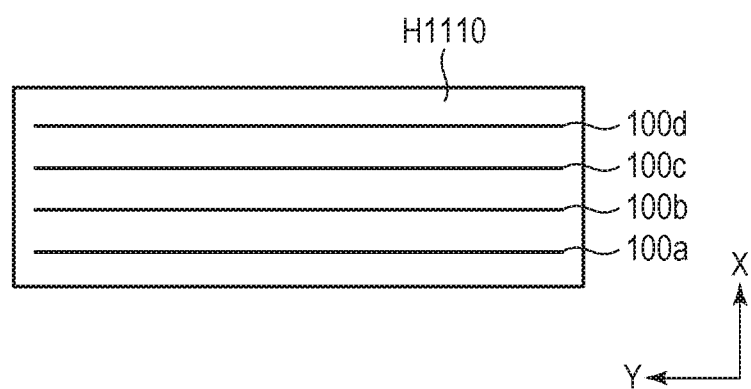
FIG. 2A, which is a view for describing an example of a recording head, is a schematic view of a recording element substrate.

Hereinafter, embodiments of the present invention are described in detail. In the present invention, hereinafter, in some cases, an aqueous ink is referred to as an "ink." Unless otherwise specified, various physical property values are values at a temperature of 25° C. "(Meth)acrylic acid" and "(meth)acrylate" are described as "acrylic acid and methacrylic acid" and "acrylate and methacrylate", respectively.

FIGS. 1A to 1C are views illustrating a relationship between an ejection orifice surface 8a of a recording head 8 and the direction of gravity. FIG. 1A is a view illustrating a case in which an angle formed between the ejection orifice surface 8a of the recording head 8 and the direction of gravity is 90°. FIG. 1B is a view illustrating a case in which an angle formed between the ejection orifice surface 8a of the recording head 8 and the direction of gravity is 45°. FIG. 1C is a view illustrating a case in which an angle formed between the ejection orifice surface 8a of the recording head 8 and the direction of gravity is 0°. In FIGS. 1A to 1C, θ represents the angle formed between the ejection orifice surface 8a of the recording head 8 and the direction of gravity (arrow G in FIGS. 1A to 1C). In a general ink jet recording method, as illustrated in FIG. 1A, ink is ejected from the recording head 8 in which the ejection orifice surface 8a of the recording head 8 is formed at an angle of 90° with respect to the direction of gravity, that is, the ejection orifice surface 8a is substantially perpendicular to the direction of gravity, such that an image is recorded. However, in an ink jet recording method according to the present invention, ink is ejected from the recording head 8 in which the ejection orifice surface 8a of the recording head 8 is formed at an angle of 0° or more to less than 90° with respect to the direction of gravity, that is, the ejection orifice surface 8a is inclined with respect to the direction of gravity, such that an image is recorded. As illustrated in FIG. 1C, the ejection orifice surface 8a of the recording head 8 may be formed at an angle of 0° with respect to the direction of gravity, that is, the ejection orifice surface 8a may be substantially parallel with the direction of gravity.

An image was recorded using the recording head 8 inclined with respect to the direction of gravity and having a plurality of ejection orifice arrays I to IV for ejecting a plurality of inks. In particular, it was found that in the case of repeating that the image was continuously recorded, then left for a long period of time, and continuously recorded again, inks were mixed, and thus color mixing recoverability was insufficient. The reason is as follows.

When the image is continuously recorded, the ink overflowed at the time of ejecting the ink is likely to a periphery of the ejection orifice. Furthermore, in addition to a main ink droplet, small accompanying ink droplets (hereinafter, referred to as "mist") increase, and the mist is likely to adhere to the periphery of the ejection orifice. When such an ink jet recording apparatus in which the ink adheres to the periphery of the ejection orifice is left for a long period of time, a liquid component in the adhered ink evaporate to precipitate a pigment in the ink, and thus unevenness is likely to occur in the periphery of the ejection orifice. When the image is continuously recorded again, although the ink already tends to adhere to the periphery of the ejection orifice, the ink is more likely to adhere thereto due to the unevenness formed in the periphery of the ejection orifice.

The phenomenon that ink tends to adhere to the periphery of the ejection orifice is a phenomenon which occurs also in a general ink jet recording method in which an image is recorded by ejecting ink from the recording head 8 in which the ejection orifice surface 8a is perpendicular to the direction of gravity. In this case, color mixing of the ink does not occur. The color mixing of the ink is a problem occurring when an image is recorded using the recording head 8 in which the ejection orifice surface 8a of the recording head 8 is inclined with respect to the direction of gravity.

Here, as an example, a description is provided while focusing on adjacent ejection orifice arrays I and II of the recording head 8 having the ejection orifice surface 8a in which four ejection orifice arrays I to IV are formed as illustrated in FIG. 1B. An ejection orifice group forming each of the ejection orifice arrays is disposed to be substantially orthogonal to a conveying direction (an arrow A in FIG. 1B) of a recording medium. Hereinafter, one ejection orifice in the ejection orifice group forming the ejection orifice array I is referred to as an ejection orifice I, and one ejection orifice in the ejection orifice group forming the ejection orifice array II is referred to as an ejection orifice II. The recording medium is conveyed in an arrow A direction, and ink is ejected onto the recording medium in a sequence of the ejection orifice arrays I and II.

When the image is recorded using the recording head 8 in which the ejection orifice surface 8a of the recording head 8 is inclined with respect to the direction of gravity, in the peripheries of the ejection orifices constituting the ejection orifice array II, force in the direction of gravity is applied to ink adhered in a direction of the ejection orifice array I. Therefore, in the peripheries of the ejection orifices constituting the ejection orifice array II, the ink tends to accumulate in the direction of the ejection orifice array I. In the case of continuously recording the image, the ink further accumulates in the direction of the ejection orifice array I in the peripheries of the ejection orifices constituting the ejection orifice array II. In addition, an ink meniscus formed at the ejection orifice II of the ejection orifice array II is destroyed, whereby the ink overflows, and the ink ejected from the ejection orifice array II flows along the ejection orifice surface 8a to thereby enter the ejection orifice array I. When the ink jet recording apparatus is left for a long time in the state in which the ink enters the ejection orifice array I, the ink of the ejection orifice array II diffuses in the ink of the ejection orifice array I, and thus the color mixing of the ink ejected from the ejection orifice array I becomes intensified. As described above, when the color mixing of ink becomes intensified and the pigment in the ink of the ejection orifice II does not remain near the meniscus of the ink formed at the ejection orifice I and enters deep into the ejection orifice, the color mixing recoverability becomes insufficient.

Further, in the recording head 8 in which the ejection orifice arrays I and II are arranged to at least partially overlap each other in the conveying direction of the recording medium, the ink ejected from the ejection orifice array II tends to enter the ejection orifice array I. As a result, color mixing occurs in the ink ejected from the ejection orifice array I, such that color mixing recoverability of the ink becomes insufficient.

The present inventors considered that in order to improve the color mixing recoverability of the ink, it was important to allow the pigment in the ink of the ejection orifice array II to remain near the meniscus of the ink formed in the ejection orifice I even if the apparatus in which the ink of the ejection orifice array II entered the ejection orifice array I was left for a long period of time. Thus, the present inventors focused on a relationship between true specific gravities of the pigment in the ink ejected from two adjacent ejection orifice arrays.

When an ink containing a pigment having a small true specific gravity among inks ejected from two adjacent ejection orifice arrays enters an ink containing a pigment having a large true specific gravity, the pigment having the small true specific gravity tends to move in a direction opposite to the direction of gravity as compared to the pigment having the large true specific gravity. Therefore, it is difficult for the pigment having the small true specific gravity to remain near the meniscus formed in the ejection orifice, and thus it is easy for the pigment to enter the inside of the ejection orifice. Thus, even if the ink is ejected, since it is difficult for the pigment having the small true specific gravity to be ejected, the color mixing recoverability becomes insufficient. Even if the ink containing the pigment having the large true specific gravity enters the ink containing the pigment having the small absolute specific gravity, it is difficult for the pigment having the large true specific gravity to move in a direction opposite to the direction of gravity as compared to the pigment having the small true specific gravity. Therefore, it is easy for the pigment having the small true specific gravity to remain near the meniscus formed in the ejection orifice, and thus it is difficult for the pigment to enter the inside of the ejection orifice. Thus, when the ink is ejected, since the pigment having the large true specific gravity is ejected, the color mixing recoverability becomes improved.

In other words, if the ink ejected from the ejection orifice array arranged below in the direction of gravity of the ink ejected from the adjacent ejection orifice arrays is the ink containing the pigment having the small true specific gravity, the color mixing recoverability is improved.

<Ink Jet Recording Method>

In the recording head used in the present invention, a first ejection orifice array and a second ejection orifice array for ejecting a first ink and a second ink, respectively, are sequentially arranged from the bottom in the direction of gravity to be adjacent to each other. In addition, the true specific gravity of the pigment in the first ink is smaller than the true specific gravity of the pigment in the second ink. Even in a case in which the recording head includes a plurality of ejection orifice arrays (third ejection orifice array and fourth ejection orifice array), as described below, it is preferable that the relationship between the true specific gravities of the pigments in the inks ejected from adjacent respective ejection orifice arrays is satisfied. Thus, the color mixing recoverability is further improved.

A third ejection orifice array for ejecting a third ink which is an aqueous ink containing a pigment is further arranged at a position adjacent to the second ejection orifice array of the recording head, and at the same time, and the second ejection orifice array and the third ejection orifice array are arranged to at least partially overlap each other in the conveying direction of the recording medium. In the recording head, the first ejection orifice array, the second ejection orifice array, and the third ejection orifice array are sequentially arranged from the bottom in the direction of gravity to be adjacent to each other. In addition, the true specific gravity of the pigment in the second ink is preferably smaller than the true specific gravity of the pigment in the third ink.

A fourth ejection orifice array for ejecting a fourth ink which is an aqueous ink containing a pigment is further arranged at a position adjacent to the third ejection orifice array of the recording head, and at the same time, the third ejection orifice array and the fourth ejection orifice array are arranged to at least partially overlap each other in the conveying direction of the recording medium. In the recording head, the first ejection orifice array, the second ejection orifice array, the third ejection orifice array, and the fourth ejection orifice array are sequentially arranged from the bottom in the direction of gravity to be adjacent to each other. In addition, the true specific gravity of the pigment in the third ink is preferably smaller than the true specific gravity of the pigment in the fourth ink.

Further, colors of the first ink and the second ink may be different from or the same as each other. When the colors of the first ink and the second ink are different from each other, color mixing in the image to be recorded is easily noticed, but even in this case, color mixing in the image can be suppressed by adopting a configuration according to the present invention. The colors of the first ink and the second ink can be selected from black, cyan, magenta, yellow, and the like, respectively. In the case of different colors, the first ink and the second ink are preferably combinations of two inks selected from the group consisting of black, cyan, magenta, and yellow inks. In the case of the same color, the first ink and the second ink are related to a dark ink and a light ink. The combination of the first ink and the second ink is preferably one selected from the group consisting of a combination of a dark ink having a black color (black ink) and a light ink having the black color (grey ink), a combination of a dark ink having a cyan color (cyan ink) and a light ink having the cyan color (light cyan ink), and a combination of a dark ink having a magenta color (magenta ink) and a light ink having the magenta color (light magenta ink).

<Ink Jet Recording Apparatus>

Hereinafter, in FIGS. 2A to 4B, an X direction refers to a horizontal direction, a Y direction refers to a depth direction of an ink jet recording apparatus, and a Z direction refers to a vertical direction.

Figure 2B:
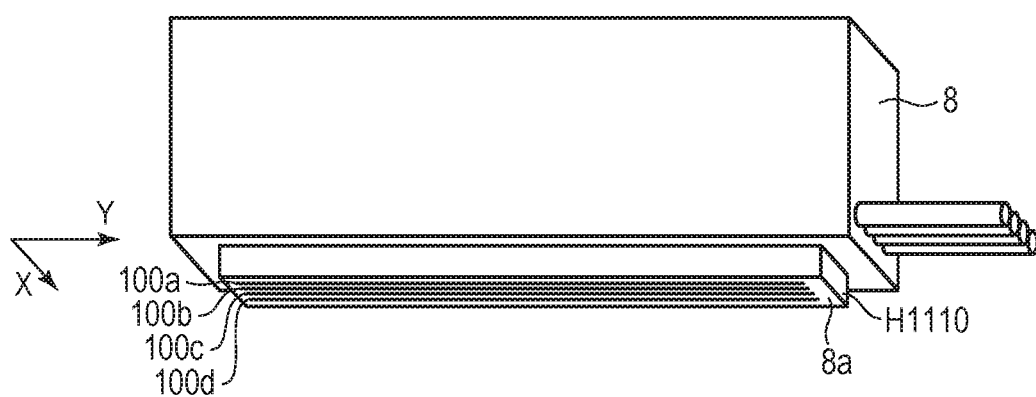
FIG. 2B, which is a view for describing an example of the recording head, is a perspective view of the recording head.

FIGS. 2A and 2B are views for describing an example of the recording head 8. FIG. 2A is a schematic view of a recording element substrate H1110. FIG. 2B is a perspective view of the recording head 8. The recording head 8 has the ejection orifice surface 8a in which a plurality of ejection orifice arrays for ejecting a plurality of inks are formed. Particularly, it is preferable to use the recording head 8 including a single recording element substrate H1110 in which the plurality of ejection orifice arrays 100a to 100d are arranged as illustrated in FIGS. 2A and 2B. FIG. 2A illustrates the recording element substrate H1110 having the four ejection orifice arrays 100a to 100d arranged in the Y direction. The ejection orifice surface 8a of the recording head 8 is a surface provided with the recording element substrate H1110 having the ejection orifice arrays. The recording element substrate H1110 may have the plurality of ejection orifice arrays. For example, in the case in which the single recording element substrate H1110 has four election orifice arrays, four kinds of inks such as cyan, magenta, yellow and black (CMYK) inks are ejected from four ejection orifice arrays, respectively.

A distance (mm) between an ejection orifice array constituted by ejection orifices ejecting one kind of ink and an ejection orifice array constituted by ejection orifices ejecting another kind of ink is preferably 0.1 mm or more to 1.5 mm or less and more preferably, 0.1 mm or more to 1.0 mm or less. More preferably, the distance is 0.3 mm or more to 1.0 mm or less. Here, the distance between the ejection orifice arrays is a distance between a line connecting the center of each ejection orifice ejecting one kind of ink and a line connecting the center of each ejection orifice ejecting another kind of ink. In the case in which there are a plurality of ejection orifice arrays for ejecting one kind of ink, the distance between an ejection orifice array composed of ejection orifices ejecting one kind of ink and an ejection orifice array composed of ejection orifices ejecting another kind of ink. The ejection orifice arrays are spaced at the nearest distance in the X direction.

When the distance between the ejection orifice arrays is short, since the ejection orifice arrays are densely arranged, a higher quality image can be recorded, but since color mixing of the ink from the ejection orifice to another ejection orifice easily occurs, a problem such as color mixing recoverability significantly occurs. Even in this case, the color mixing recoverability is improved by adopting the configuration according to the present invention.

A long diameter (μm) passing through the center of the ejection orifice of the recording head 8 is preferably 10 μm or more to 50 μm or less. Further, an ejection amount (ng) of the one ink droplet ejected from the recording head 8 is preferably 8.0 ng or less. When the ejection amount is more than 8.0 ng, since at the time of ejecting the ink, the ink easily overflows and thus the mist is easily increased, the ink more easily adheres to the periphery of the ejection orifice. Therefore, color mixing of the ink may easily occur, such that color mixing recoverability decreases. The ejection amount (ng) is more preferably 2.0 ng or more.

FIG. 2B illustrates the recording head 8 including one recording element substrate H1110. The recording head 8 may include one recording element substrate H1110 or may include a plurality of recording element substrates H1110. In the case of using the recording head including the plurality of recording element substrates H1110, a recording head in which a plurality of recording element substrates H1110 are arranged so as to correspond a width of the recording medium in the Y direction in FIGS. 2A and 2B, that is, a line head is preferably used. In the case of using the recording head including the plurality of recording element substrates H1110, it is preferable to arrange the plurality of recording element substrates H1110 so that the ejection orifices overlap each other in the conveying direction of the recording medium. In this way, it is possible to suppress black streaks and white voids in connection portions between the recording element substrates H1110. However, since the ejection orifices overlap each other, color mixing of the ink from the ejection orifice to another ejection orifice easily occurs, and thus the problem such as color mixing recoverability significantly occurs. Even in this case, the color mixing recoverability is improved by adopting the configuration according to the present invention.

FIGS. 3A and 3B are schematic views of line heads. FIG. 3A is a schematic view of a line head in which the recording element substrates H1110 are arranged in a zigzag shape (non-adjacent arrangement) in an arrangement direction of a plurality of ejection orifice arrays. FIG. 3B is a schematic view of a line head in which the recording element substrates H1110 are arranged in a linear shape (adjacent arrangement) in an arrangement direction of a plurality of ejection orifice arrays. In FIGS. 3A and 3B, a plurality of recording element substrates H1110 are arranged on a support substrate. In order to aim for miniaturization of the apparatus, it is preferable to use a line head in which the plurality of recording element substrates H1110 are arranged to be adjacent in an arrangement direction of the first ejection orifice array and the second ejection orifice array in order to suppress an increase in a length of the line head in the X direction in FIG. 3. In other words, it is preferable to use a line head in which a plurality of recording element substrates H1110 are arranged in a linear shape. Further, an example of a shape of the recording element substrate H1110 may include a parallelogram, a rectangle, a trapezoid and other shapes, but the parallelogram is preferable.

As a method of ejecting the ink, a method of applying mechanical energy to the ink, a method of applying heat energy to the ink, and the like, can be used. Among those, as the method of ejecting the ink, the method of applying heat energy to the ink is preferably used.

Figure 4B:
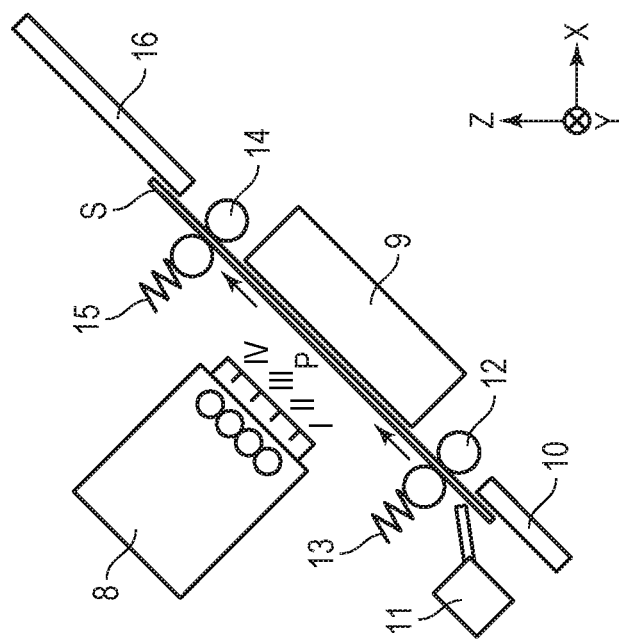
FIG. 4B, which is a view schematically illustrating an example of an ink jet recording apparatus, is an enlarged view of a portion around the recording head.
Figure 4A:
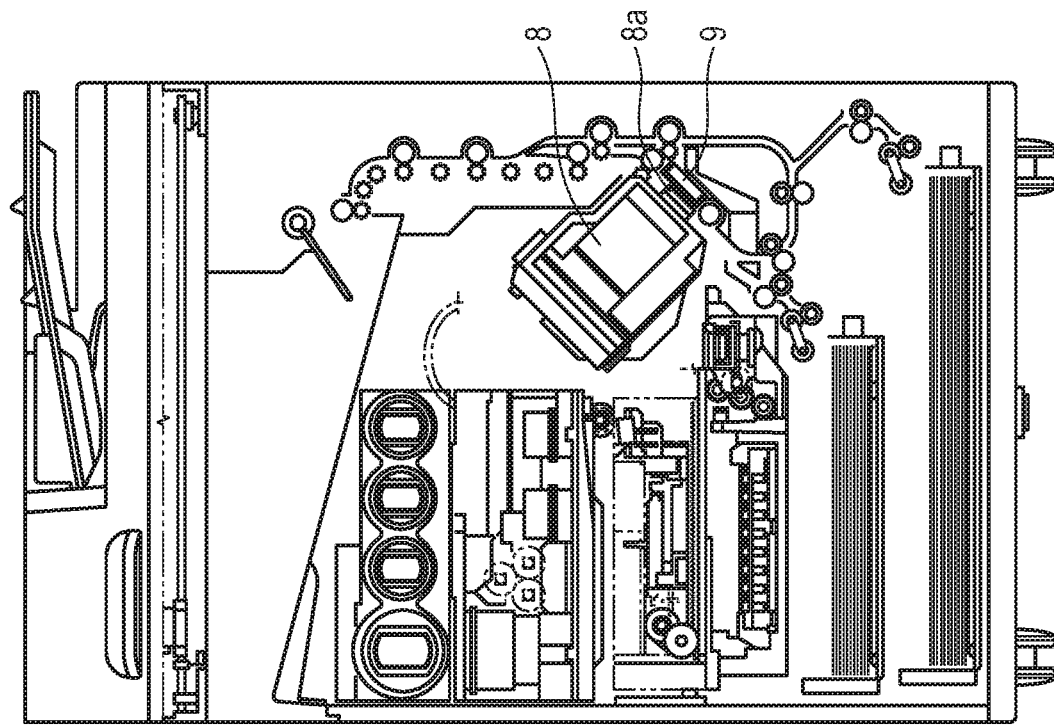
FIG. 4A, which is a view schematically illustrating an example of an ink jet recording apparatus, is a cross-sectional view of an entire apparatus.

FIGS. 4A and 4B are views for describing an example of an ink jet recording apparatus, wherein FIG. 4A is a cross-sectional view of an entire apparatus, and FIG. 4B is an enlarged view of a portion around the recording head 8. As illustrated in FIGS. 4A and 4B, in order to miniaturize the apparatus, it is preferable to use an ink jet recording apparatus capable of recording an image by a single recording head 8 capable of ejecting a plurality of kinds of inks instead of recording the image by a plurality of recording heads corresponding to the plurality of kinds of inks. At the time of ejecting the ink to record an image, as illustrated in FIGS. 4A and 4B, an angle formed between an ejection orifice surface 8a of the recording head 8 and the direction of gravity is 0° or more to less than 90° and the ink is ejected from the recording head 8 inclined with respect to the direction of gravity, such that the image is recorded.

In addition, at the time of ejecting the ink to record the image, a difference between an angle formed between a recording medium S and the direction of gravity and the angle formed between the ejection orifice surface 8a of the recording head 8 and the direction of gravity is preferably ±5° or less and more preferably 0°. That is, a difference between a distance between ejection orifices forming an ejection orifice array I and the recording medium S and a distance between ejection orifices forming an ejection orifice array IV and the recording medium S is preferably ±1 mm or less and more preferably 0 mm. Here, the distance between the ejection orifice and the recording medium S is a distance between the center of the ejection orifice and a position at which a line intersects the recording medium S when the line is extended from the center of the ejection orifice in the direction of gravity. As described above, by setting the conveying direction of the recording medium S at the time of recording an image to the above conditions, a conveying distance of the recording medium S in the X direction is also shortened, thereby making it possible to miniaturize the apparatus. In order to further shorten the conveying distance of the recording medium S in the X direction, the angle formed between the ejection orifice surface 8a of the recording head 8 and the direction of gravity is 10° or more to 80° or less, and more preferably 30° or more to 60° or less.

The ejection orifice surface 8a of the recording head 8 faces a platen 9. In FIGS. 4A and 4B, a plane of the platen 9 is inclined at about 45° with respect to the direction of gravity, and the ejection orifice surface 8a of the recording head 8 is also inclined at about 45° with respect to the direction of gravity so that a distance from the platen 9 is constantly maintained. When the ink jet recording apparatus does not perform a recording operation, the angle formed between the ejection orifice surface 8a of the recording head 8 and the direction of gravity is 90°.

Further, a conveyance path of the recording medium S at the time of recording an image is described. In FIG. 4B, the recording medium S is guided by a first guide 10, and a tip position of the recording medium S is detected by a paper sensor 11. The recording medium S is conveyed toward a recording region P between the recording head 8 and the platen 9 while being sandwiched between a first conveying roller 12 and a first pinch roller 13 constituted by a spur biased by a spring, and the like. In the recording region P, the ink is ejected from the plurality of ejection orifice arrays I to IV in the recording head 8 to the recording medium S. A rear surface of the recording medium S in the region to which the ink is applied is supported by the platen 9, and the distance between the ejection orifice surface 8a and the recording medium S is constantly maintained. After the ink is applied, the recording medium S is guided by a second guide 16 while being sandwiched between a second conveying roller 14 and a second pinch roller 15, such that the recording medium S is conveyed. The conveying direction of the recording medium S at the time of recording the image may be opposite to a direction illustrated in FIG. 4B, but it is preferable that the conveying direction is the same direction as the direction illustrated in FIG. 4B. That is, it is preferable that a first ejection orifice array (ejection orifice array I) disposed at an upstream side in the conveying direction of the recording medium S is disposed at the lower side in the direction of gravity than a second ejection orifice array (ejection orifice array II) disposed at a downstream side in the conveying direction of the recording medium S. In addition, it is preferable that the conveying direction of the recording medium S at the time of recording the image is a direction intersecting an arrangement direction of the ejection orifice arrays I to IV.

In order to suppress a variation in the ejection amount of the ink, it is preferable to preheat the ink before ejecting the ink based on image data. This preheating is an operation of heating the ink using a heating element present in the vicinity of the recording element for ejecting the ink. Since a viscosity of the ink is easily lowered by heating the ink, the ink ejected from the ejection orifice is likely to flow along the ejection orifice surface 8a, and color mixing of the ink easily occurs. Therefore, the problem of the color mixing recoverability significantly occurs. Even in this case, the color mixing recoverability is improved by adopting the configuration according to the present invention.

Further, it is preferable that the ejection orifice surface 8a of the recording head 8 is subjected to water-repellent treatment. In this way, since a contact angle between the ink adhered to the periphery of the ejection orifice and the ejection orifice surface 8a is increased, the ink droplets easily become granular. Therefore, it is hard for the ink to flow along the ejection orifice surface 8a in the direction of gravity and the color mixing recoverability can be further improved.

As a method of performing water-repellent treatment on the ejection orifice surface 8a, a method of applying a water-repellent material with a spray, a method of adhering a water-repellent material by vacuum deposition or plasma polymerization and the like can be selected. Water-repellency of the formed ejection orifice surface 8a can be determined by measuring a contact angle of a water droplet on a surface of the member. When the contact angle of the water droplet is 70° or more, the member can be said to have water-repellency, and it is preferable that the contact angle of the water droplet is 90° or more. Further, the contact angle of the water droplet can be measured using pure water (ion exchange water) and a general contact angle meter. As an example of the contact angle meter, an automatic contact angle measuring device (CA-W, Kyowa Interface Science Co., Ltd.) can be used.

As an example of the water-repellent material, a fluororesin based compound is preferably used. Particularly, it is preferable that a water-repellent surface is formed as a uniform resin film made of the fluororesin based compound, and it is preferable that the resin film does not contain a metal such as nickel or the like. Examples of the fluororesin based compound include a polytetrafluoroethylene resin, a fluororesin having a cyclic structure and the like. Specific examples thereof can include Polyflon PTFE (manufactured by Daikin Industries Ltd), Teflon (registered trademark) PTFE (manufactured by DuPont), Cytop (manufactured by AGC), and the like. In addition, other fluorine atom-containing resins such as fluorinated epoxy resins, fluorinated polyimide resins, fluorinated polyamide resins, fluorinated acrylic resins, fluorinated urethane resins, fluorinated siloxane resins, and modified resins thereof can also be used. Further, as the water-repellent material, compounds containing a silicon atom or silicone based resins may be used.

Particularly, in view of obtaining high water-repellency and durability, as the water-repellent material, it is preferable to use a hydrolyzable silane compound having a fluoroalkyl group and a condensate of a hydrolyzable silane compound having a cationic polymerizable group. Further, a resin obtained by curing the condensate by irradiation with an active energy ray such as ultraviolet ray or the like may also be used. These hydrolyzable silane compounds have a hydrolyzable group in their molecular structure. An example of the hydrolyzable group can include an alkoxy group. Further, examples of the cationic polymerizable group can include a cyclic ether group, a cyclic vinyl ether group and the like.

The ink jet recording apparatus may include a unit for applying a reaction liquid containing a reaction agent for aggregating a coloring material in the ink onto the recording medium S. Examples of the unit for applying the reaction liquid onto the recording medium S may include a unit for applying the reaction liquid onto the recording medium S with a roller or the like, a unit for ejecting the reaction liquid from an ink jet type recording head 8 and the like. The ink jet recording apparatus of the present invention needs not to have to include an irradiation unit of an energy ray.

<Ink>

Hereinafter, each component constituting the ink used in the present invention is described in detail. The inks used in the present invention may not contain compounds polymerized by irradiation with an energy ray.

(Pigment)

The ink contains a pigment. A content of the pigment in the ink is preferably 0.1% by mass or more to 15.0% by mass or less and more preferably 1.0% by mass or more to 11.0% by mass or less based on a total mass of the ink.

As a dispersion method of the pigment, a resin-dispersed pigment using a resin as a dispersant, a self-dispersible pigment in which a hydrophilic group is bonded to a particle surface of the pigment, and the like can be used. Further, a resin-bonded pigment in which an organic group containing a resin is chemically bonded to a particle surface of the pigment, and a microcapsule pigment in which a particle surface of the pigment is coated with a resin, or the like can also be used. It is possible to use pigments of which dispersion methods are different from each other in combination. Further, even if the dispersion method of the pigment is different, the ease of diffusing the pigment in the ink when the ink is mixed is greatly affected by the true specific gravity (g/cm³) of the pigment.

Specific examples of the pigment can include inorganic pigments such as carbon black and titanium oxide, and the like; and organic pigments such as azo, phthalocyanine, quinacridone, isoindolinone, imidazolone, diketopyrrolopyrrole, and dioxazine.

[True Specific Gravity]

The ease of diffusing the pigment in the ink when the ink is mixed is greatly affected by the true specific gravity (g/cm³) of the pigment. The true specific gravity of the pigment refers to a specific gravity determined by the structure of the pigment. The true specific gravity of the pigment can be measured using a float type gravimeter (standard gravimeter manufactured by Tech Jam). When the ink contains a plurality of kinds of pigments, it is preferable to use a plurality of inks satisfying the relationship of the true specific gravity of the pigment based on the true specific gravity of the pigment having a high content. Specifically, the true specific gravity of the pigment is shown below. Regarding the organic pigment, the following values are described in the organic pigment handbook (color office edition, Color Office, 2006), wherein the numerical values in parentheses represent the true specific gravities of the pigment.

C.I. Pigment Yellow 74 (1.4), C.I. Pigment Yellow 128 (1.5), C.I. Pigment Yellow 155 (1.4), C.I. Pigment Red 122 (1.4), C.I. Pigment Red 149 (1.4), C.I. Pigment Red 202 (1.5), C.I. Pigment Violet 19 (1.5), C.I. Pigment Violet 23 (1.5), C.I. Pigment Blue 1 (1.8), C.I. Pigment Blue 15:3 (1.6), C.I. Pigment Blue 15:4 (1.7), C.I. Pigment Green 36 (2.9), and carbon black (1.9).

(First Water-Soluble Organic Solvent)

It is preferable that the ink contains a first water-soluble organic solvent having a relative dielectric constant of 20.0 or more. By suppressing aggregation of the pigment to reduce unevenness of the periphery of the ejection orifice, it is difficult for the ink to be accumulated in the periphery of the ejection orifice, such that it is hard for the ink to flow along the ejection orifice surface 8a. Therefore, color mixing of the ink is suppressed, such that color mixing recoverability can be more suppressed. The relative dielectric constant of the first water-soluble organic solvent is more preferably 45.0 or less. A vapor pressure of the first water-soluble organic solvent at a temperature of 25° C. is preferably lower than that of water.

The relative dielectric constant of the water-soluble organic solvent can be measured at 10 kHz using a dielectric constant meter (for example, BI-870 manufactured by Brookhaven Instruments Corporation, or the like). The relative dielectric constant $\varepsilon_{sol}$ of a water-soluble organic solvent in a solid state at a temperature of 25° C. can be calculated according to the following Equation (1) by measuring a relative dielectric constant $\varepsilon_{50\%}$ of a 50.0% by mass aqueous solution.

$$\varepsilon_{sol} = 2\varepsilon_{50\%} - \varepsilon_{water} \quad \text{Equation (1)}$$

$\varepsilon_{sol}$: relative dielectric constant of solid water-soluble organic solvent at a temperature of 25° C.

$\varepsilon_{50}\%$: relative dielectric constant of 50.0% by mass aqueous solution of solid water-soluble organic solvent at a temperature of 25° C.

$\varepsilon_{water}$: relative dielectric constant of water

The reason for calculating the relative dielectric constant $\varepsilon_{sol}$ of the solid water-soluble organic solvent at a temperature of 25° C. from the relative dielectric constant $\varepsilon_{50\%}$ of the 50.0% by mass aqueous solution is as follows. It may be difficult to prepare a high-concentration aqueous solution with a concentration exceeding 50.0% by mass which may be a constituent component of the ink in the solid water-soluble organic solvent at a temperature of 25° C. Meanwhile, the relative dielectric constant $\varepsilon_{water}$ of water is dominant in a low-concentration aqueous solution with a concentration of 10.0% by mass or less, such that it is difficult to obtain a value of a probable (effective) relative dielectric constant of a water-soluble organic solvent. Therefore, as a result of the study by the present inventors, it was found that aqueous solutions to be measured can be prepared using most of the solid water-soluble organic solvent at a temperature of 25° C. used in the ink, and the calculated relative dielectric constant $\varepsilon_{sol}$ is also consistent with the effect of the present invention. Due to the above-mentioned reason, in the present invention, the relative dielectric constant $\varepsilon_{sol}$ of the solid water-soluble organic solvent at a temperature of 25° C. is calculated from the relative dielectric constant $\varepsilon_{50\%}$ of the 50.0% by mass aqueous solution to thereby be used. Even in a case of the solid water-soluble organic solvent at a temperature of 25° C., when it is impossible to prepare a 50.0% by mass aqueous solution due to low solubility in water, an aqueous solution having a saturated concentration is used, and a value of the relative dielectric constant calculated in accordance with the case of calculating $\varepsilon_{sol}$ is used for convenience.

Specific examples of the first water-soluble organic solvent may include monohydric alcohols having 1 or more to 4 or less carbon atoms such as methyl alcohol (33.1) and ethyl alcohol (23.8); dihydric alcohols such as 1,2-propanediol (28.8), 1,3-butanediol (30.0), 1,4-butanediol (31.1), 1,5-pentanediol (27.0), and 3-methyl-1,5-pentanediol (23.9); polyhydric alcohols such as 1,2,6-hexanetriol (28.5), glycerin (42.3) and trimethylolpropane (33.7); alkylene glycols such as ethylene glycol (40.4), diethylene glycol (31.7), triethylene glycol (22.7), and tetraethylene glycol (20.8); nitrogen-containing compounds such as 2-pyrrolidone (28.8), N-methyl-2-pyrrolidone (32.0), urea (110.3), ethylene urea (49.7), and triethanol amine (31.9); and sulfur-containing compounds such as dimethylsulfoxide (48.9).

A content (% by mass) of the first water-soluble organic solvent is preferably 3.0 times or more as a mass ratio (times) with respect to the content (% by mass) of the pigment. When the ratio is 3.0 times or more, since the content of the first water-soluble organic solvent is higher than that of the pigment, precipitation of the pigment is suppressed to reduce unevenness of the periphery of the ejection orifice, and thus it is difficult for the ink to be accumulated in the periphery of the ejection orifice, such that it is hard for the ink to flow along the ejection orifice surface 8a. As a result, color mixing of the ink is suppressed, such that color mixing recoverability can be more suppressed. It is more preferable that the ratio is 7.0 times or less.

The content (% by mass) of the first water-soluble organic solvent in the ink containing the pigment having a large true specific gravity is preferably 1.0 times or more as a mass ratio (times) with respect to the content (% by mass) of the first water-soluble organic solvent in the ink containing the pigment having a small true specific gravity. When the ratio is 1.0 times or more, precipitation of the pigment is suppressed in the periphery of the ejection orifice for ejecting the ink containing the pigment having the large true specific gravity, and thus the unevenness in the periphery of the ejection orifice is reduced. Thus, since it is difficult for the ink to be accumulated in the periphery of the ejection orifice, it is hard for the ink to flow along the ejection orifice surface 8a. As a result, the ink containing a pigment having the large absolute specific gravity is difficult to be mixed with the ink containing a pigment having the small true specific gravity, and thus the color mixing recoverability of the ink is further improved.

(Aqueous Medium)

The ink can contain water or an aqueous medium which is a mixed medium of water and a water-soluble organic solvent. As the water, deionized water or ion exchange water is preferably used. A content (% by mass) of water in the aqueous ink is 50.0% by mass or more to 95.0% by mass or less based on the total mass of the ink.

As the water-soluble organic solvent, a water-soluble organic solvent (other water-soluble organic solvents) in addition to the first water-soluble organic solvent can be used in combination. Other water-soluble organic solvents are not particularly limited as long as the water-soluble organic solvents are water-soluble. For example, alcohols, glycols, glycol ethers, nitrogen-containing compounds, and the like can be used. Further, one or two kinds or more of other water-soluble organic solvents can be contained in the ink. A content (% by mass) of the water-soluble organic solvent in the ink is preferably 3.0% by mass or more to 50.0% by mass or less based on the total mass of the ink. The content is a value including the first water-soluble organic solvent. The content (% by mass) of the first water-soluble organic solvent is preferably 0.5 time or more to 1.0 time or less as a mass ratio (times) with respect to a total content (% by mass) of the water-soluble organic solvents.

Specific examples of the water-soluble organic solvent may include the following water-soluble organic solvents as well as the specific water-soluble organic solvents described above (numerical values in parentheses indicate relative dielectric constant $\varepsilon_{sol}$ at a temperature of 25° C.). Monohydric alcohols having 1 or more to 4 or less carbon atoms such as methyl alcohol (33.1), ethyl alcohol (23.8), n-propyl alcohol, isopropyl alcohol (18.3), n-butyl alcohol, sec-butyl alcohol, and tert-butyl alcohol; dihydric alcohols such as 1,2-propanediol (28.8), 1,3-butanediol (30.0), 1,4-butanediol (31.1), 1,5-pentanediol (27.0), 1,2-hexanediol (14.8), 1,6-hexanediol (7.1), 2-methyl-1,3-propanediol, and 3-methyl-1,5-pentanediol (23.9); polyhydric alcohols such as 1,2,6-hexanetriol (28.5), glycerin (42.3), trimethylolpropane (33.7), and trimethylolethane; alkylene glycols such as ethylene glycol (40.4), diethylene glycol (31.7), triethylene glycol (22.7), tetraethylene glycol, butylene glycol, hexylene glycol, and thioglycol glycol; glycol ethers such as diethylene glycol monomethyl ether, diethyleneglycol monoethyl ether, triethylene glycol monoethyl ether, and triethylene glycol monobutyl ether (9.8); polyalkylene glycols having a number average molecular weight of 200 or more to 1,000 or less such as polyethylene glycol (11.5) having a number average molecular weight of 600, polyethylene glycol (4.6) having a number average molecular weight of 1,000 and polypropylene glycol; nitrogen-containing compounds such as 2-pyrrolidone (28.8), N-methyl-2-pyrrolidone (32.0), 1,3-dimethyl-2-imidazolidinone, N-methylmorpholine, urea (110.3), ethylene urea (49.7) and triethanolamine (31.9); and sulfur-containing compounds such as dimethylsulfoxide (48.9) and bis(2-hydroxymethylsulfone). As the water-soluble organic solvent to be contained in the ink, it is preferable that a relative dielectric constant $\varepsilon_{sol}$ is 3.0 or more and a vapor pressure at a temperature of 25° C. is lower than that of water.

(Other Additives)

If necessary, the ink may contain various additives such as a surfactant, a pH adjusting agent, a defoaming agent, a rust preventing agent, an antiseptic, an antifungal agent, an antioxidant, a reduction inhibitor, a chelating agent, and a resin. Further, in general, since a content of these additives in the ink is significantly small, its influence on the effect of the present invention is also small. For this reason, in the present invention, these additives are not included in the "water-soluble organic solvent" and are not subject to calculation of the relative dielectric constant $\varepsilon_{sol}$.

(Physical Properties)

In order to suppress color mixing of the ink, it is important to make it hard for the ink to adhere to the periphery of the ejection orifice at the time of ejecting the ink. Therefore, since a time required from foaming to ejecting the ink is several milliseconds (msec), attention was focused on a dynamic surface tension of the ink at 10 msec as a very short lifetime that can be accurately measured. The dynamic surface tension (mN/m) of the ink at a lifetime of 10 msec is preferably 35 mN/m or more.

When the dynamic surface tension is less than 35 mN/m, it is hard for tension for decreasing a surface area to act on a surface of the ink, such that when the ink is ejected, the ink easily adheres to the periphery of the ejection orifice. Therefore, since the ink ejected from the ejection orifice easily flows along the ejection orifice surface 8a, color mixing of the ink occurs, such that color mixing recoverability decreases. The dynamic surface tension is more preferably 48 mN/m or less.

The dynamic surface tension of the ink is measured by a maximum foam pressure method. In this method, surface tension is obtained by immersing a probe (thin tube) in a liquid to be measured and measuring a maximum pressure required to release air bubbles pushed out from a tip portion of the probe. Further, the lifetime is a time required to reach the maximum bubble pressure (a radius of curvature of the air bubble and a radius of the tip portion of the probe are equal to each other) after the air bubble is released and a new surface is formed when the air bubble is formed from the tip portion of the probe.

In addition, static surface tension (mN/m) of the ink is preferably 30 mN/m or more to 40 mN/m or less. The static surface tension of the ink is measured by a Wilhelmy balance method (plate method). A value of the surface tension can be appropriately adjusted depending on the kind and an amount of a surfactant.

A viscosity of the ink at a temperature of 25° C. is preferably 1 mPa·s or more to 15 mPa·s or less.

A difference in specific gravity between a first ink and a second ink is preferably 0.05 or less, and more preferably 0.03 or less. When the difference in specific gravity between the first ink and the second ink is large, the ink having a large true specific gravity remains near the meniscus of the ejection orifice, but the ink having a small true specific gravity enters the inside of the ejection orifice, and thus the ink is easily mixed. This may result in insufficient color mixing recoverability of the ink.

Example

Hereinafter, the present invention will be described in more detail through Examples, Comparative Examples and Reference Examples, but the present invention is not limited to the following Examples as long as the present invention does not depart from the gist thereof. Further, terms "parts"

and "%" with respect to the amount of components are based on mass unless otherwise specified.

<Preparation of Pigment Dispersion Liquid>

(Pigment Dispersion Liquid 1)

A pigment (20.0 g), a treatment agent (8.0 mmol), nitric acid (8.0 mmol), and water (200.0 mL) were mixed. As the pigment, C.I. Pigment Yellow 74 (Hansa yellow SGXB manufactured by Clariant) was used. As the treatment agent, p-aminophthalic acid was used. The mixture was mixed at a temperature of 25° C. and 6,000 rpm for 30 minutes using a Silverson mixer. To the obtained mixture, an aqueous solution in which 8.0 mmol of potassium nitrite was dissolved in a small amount of water was slowly added. By addition of the aqueous solution, a temperature of the mixture reached 60° C. The mixture was reacted at a temperature of 60° C. for 1 hour. Thereafter, the pH of the mixture was adjusted to 10 using a 1.0 mol/L of aqueous solution of potassium hydroxide. After 30 minutes, 20.0 mL of water was added to the mixture, and the mixture was subjected to removal of low molecular substances and desalting using a spectrum membrane. Further, the mixture was diluted with water to obtain a pigment dispersion liquid 1 (pigment content: 10.0%) containing a self-dispersible pigment. The pigment dispersion liquid 1 contained a self-dispersible pigment in which a —$C_6H_3$—$(COOK)_2$ group was bound to a particle surface.

(Pigment Dispersion Liquid 2)

The type of pigment was changed to C.I. Pigment Yellow 128 (Cromophtal Yellow D0980J manufactured by BASF) in the preparation of the pigment dispersion liquid 1. A pigment dispersion liquid 2 (pigment content: 10.0%) was obtained in a similar manner to the preparation of the pigment dispersion liquid 1 except for the above-mentioned change. In the pigment dispersion liquid 2, a self-dispersible pigment having a —$C_6H_3$—$(COOK)_2$ group bonded to a particle surface of the pigment was contained.

(Pigment Dispersion Liquid 3)

In the preparation of the pigment dispersion liquid 1, the amount of the treatment agent was changed to 4.0 mmol, and the type of pigment was changed to C.I. Pigment Violet 19 (Hostaperm Red Violet Er 02 manufactured by Clariant). A pigment dispersion liquid 3 (pigment content: 10.0%) was obtained in a similar manner to the preparation of the pigment dispersion liquid 1 except for the above-mentioned change. The pigment dispersion liquid 3 contained a self-dispersible pigment in which a —$C_6H_3$—$(COOK)_2$ group was bound to a particle surface.

(Pigment Dispersion Liquid 4)

In the preparation of the pigment dispersion liquid 1, the amount of the treatment agent was changed to 4.0 mmol, and the type of pigment was changed to C.I. Pigment Red 122 (Ink Jet Magenta E 02 manufactured by BASF). A pigment dispersion liquid 4 (pigment content: 10.0%) was obtained in a similar manner to the preparation of the pigment dispersion liquid 1 except for the above-mentioned change. The pigment dispersion liquid 4 contained a self-dispersible pigment in which a —$C_6H_3$—$(COOK)_2$ group was bound to a particle surface.

(Pigment Dispersion Liquid 5)

In the preparation of the pigment dispersion liquid 1, the amount of the treatment agent was changed to 1.6 mmol, and the type of pigment was changed to C.I. Pigment Blue 15:3 (Hostaperm Blue B2G manufactured by Clariant). A pigment dispersion liquid 5 (pigment content: 10.0%) was obtained in a similar manner to the preparation of the pigment dispersion liquid 1 except for the above-mentioned change. The pigment dispersion liquid 5 contained a self-dispersible pigment in which a —$C_6H_3$—$(COOK)_2$ group was bound to a particle surface.

(Pigment Dispersion Liquid 6)

To a solution of 5.0 g of concentrated hydrochloric acid dissolved in 5.5 g of water, 1.6 g of 4-amino-1,2-benzenedicarboxylic acid was added at a temperature of 5° C. To maintain the temperature at 10° C. or less, a solution obtained by dissolving 1.8 g of sodium nitrite in 9.0 g of water was added to the solution obtained above while stirring in an ice bath. After stirring for 15 minutes, 6.0 g of carbon black having a specific surface area of 220 $m^2/g$ and a DBP oil absorption of 105 mL/100 g was added thereto and mixed. Further, after stirring for 15 minutes, the obtained slurry was filtered with filter paper (standard filter paper No. 2 manufactured by Advantec), and the carbon black was thoroughly washed with water and dried in an oven at 110° C. Water was added to the obtained carbon black to obtain a pigment dispersion liquid in a state in which a self-dispersible pigment in which a —$C_6H_3$—$(COONa)_2$ group was bound to a particle surface of carbon black was dispersed in water (pigment content: 10.0%). Then, a sodium ion of the pigment dispersion liquid was substituted into a potassium ion using an ion exchange method.

(Pigment Dispersion Liquid 7)

A pigment (12.0 parts), a liquid (24.0 parts) containing a resin, and an ion-exchanged water (64.0 parts) were mixed. As the pigment, C.I. Pigment Blue 15:3 (Hostaperm Blue B2G manufactured by Clariant) was used. As a liquid containing a resin, a liquid obtained by neutralizing a styrene-acrylic acid copolymer (Joncryl 680 manufactured by BASF) with an aqueous potassium hydroxide solution of 0.85 equivalents based on an acid value of the copolymer, wherein a resin content was 20.0%, was used. This mixture was dispersed for 3 hours while cooling with water using a batch type vertical sand mill (manufactured by Aimex Co., Ltd.) filled with 85.0 parts of zirconia beads having a particle diameter of 0.3 mm. Then, this dispersion liquid was centrifuged to remove coarse particles, and was subjected to pressure filtration with a cellulose acetate filter (manufactured by Advantec) having a pore size of 3.0 μm. According to the above-described method, a pigment dispersion liquid 7 (pigment content: 10.0%, resin content: 4.0%) in a state in which the pigment was dispersed in water by the resin was obtained.

<Preparation of Ink>

Respective components illustrated in Table 1 were mixed and sufficiently stirred. Then, the mixture was subjected to pressure-filtration using a cellulose acetate filter (manufactured by Advantech Co., Ltd.) having a pore size of 0.8 μm, thereby preparing ink. Acetylenol E100 is a non-ionic surfactant manufactured by Kawaken Fine Chemicals Co., Ltd. A numerical value attached to polyethylene glycol indicates a number average molecular weight. Relative dielectric constant of water-soluble organic solvents indicated in parentheses are values obtained at a frequency of 10 kHz using a dielectric constant meter (BI-870 manufactured by Brookhaven Instruments Corporation).

TABLE 1

Table 1: Composition and Properties of Ink

| | Black Ink 1 | Black Ink 2 | Black Ink 3 | Black Ink 4 | Cyan Ink 1 | Cyan Ink 2 | Magenta Ink 1 | Magenta Ink 2 | Yellow Ink 1 | Yellow Ink 2 | Yellow Ink 3 | Yellow Ink 4 |
|---|---|---|---|---|---|---|---|---|---|---|---|---|
| Pigment Dispersion Liquid 1 | | | 5.0 | | | | | | 40.0 | 40.0 | | 40.0 |
| Pigment Dispersion Liquid 2 | | | | | | | | | | | 40.0 | |
| Pigment Dispersion Liquid 3 | | | | | | | 40.0 | | | | | |
| Pigment Dispersion Liquid 4 | | | | | | | | 40.0 | | | | |
| Pigment Dispersion Liquid 5 | | | | | 40.0 | | | | | | | |
| Pigment Dispersion Liquid 6 | 40.0 | 40.0 | 35.0 | 40.0 | | | | | | | | |
| Pigment Dispersion Liquid 7 | | | | | | 40.0 | | | | | | |
| Glycerin (42.3) | 12.0 | | 12.0 | | 12.0 | 12.0 | 12.0 | 12.0 | 12.0 | | 12.0 | |
| Triethylene glycol (22.7) | 12.0 | | 12.0 | 12.0 | 12.0 | 12.0 | 12.0 | 12.0 | 12.0 | | 12.0 | 12.0 |
| 1,2-hexanediol (14.8) | | 12.0 | | 12.0 | | | | | | 12.0 | | 12.0 |
| Polyethylene glycol 600 (11.4) | | 12.0 | | | | | | | | 12.0 | | |
| Acetylenol E100 | 1.0 | 1.0 | 1.0 | 1.0 | 1.0 | 1.0 | 1.0 | 1.0 | 1.0 | 1.0 | 1.0 | 1.0 |
| Ion Exchange Water | 35.0 | 35.0 | 35.0 | 35.0 | 35.0 | 35.0 | 35.0 | 35.0 | 35.0 | 35.0 | 35.0 | 35.0 |
| True Specific Gravity (g/cm$^3$) of Pigment | 1.9 | 1.9 | 1.9 | 1.9 | 1.6 | 1.6 | 1.5 | 1.4 | 1.4 | 1.4 | 1.5 | 1.4 |

<Evaluation>

In the present invention, as the evaluation criteria for evaluation described below, "A" or "B" was set as an acceptable level, and "C" was set as an unacceptable level. Evaluation results are shown in Table 3 below. The ink was mounted in a recording head having a single recording element substrate using an ink jet recording apparatus having the configuration illustrated in FIGS. 4A and 4B. As the recording head, recording heads 1 to 8 illustrated in Table 2 were used.

In Table 2, ejection orifice arrays of the recording element substrate correspond to the ejection orifice arrays I to IV illustrated in FIGS. 1A to 1C. In recording element substrates of the recording heads 1 to 6 and 8, the ejection orifice arrays overlap each other in a conveying direction of a recording medium, but in a recording element substrate of the recording head 7, the ejection orifice arrays does not overlap each other in the conveying direction of the recording medium. Further, the recording head 5 has the ejection orifice arrays I to III, but the ink is not ejected from the ejection orifice array II.

In the recording heads 1 to 8, the number of ejection orifices per one ejection orifice array was 1024, and a density of the ejection orifices per one ejection orifice array was 600 dpi. In addition, a long diameter (μm) passing through the center of the ejection orifice was 20 μm, and a distance (mm) between adjacent ejection orifice arrays was 0.7 mm. In addition, an ejection orifice surface of the recording head was subjected to water-repellent treatment by a condensate of a hydrolyzable silane compound containing a fluoroalkyl group and a hydrolyzable silane compound containing a cationic polymerizable group.

In Examples, an image recorded under a condition at which three ink droplets (5.0 ng) were applied to a unit area of 1/600 inch×1/600 inch was defined to have a recording duty of 100%, and a conveyance speed of the recording medium was 15 inch/second. In the case of conveying the recording medium in a direction from the ejection orifice array I to the ejection orifice array II ("I→II" in Table 3), at the time of recording the image, the recording medium was conveyed from a bottom to a top in the direction of gravity. In the case of conveying the recording medium in a direction from the ejection orifice array II to the ejection orifice array I ("II→I" in Table 3), at the time of recording the image, the recording medium was conveyed from the top to the bottom in the direction of gravity.

TABLE 2

Configuration of Recording Head

| | | Recording Head No. | | | | | | | |
|---|---|---|---|---|---|---|---|---|---|
| | | 1 | 2 | 3 | 4 | 5 | 6 | 7 | 8 |
| Structure of Recording Element Substrate | Ejection Orifice Array IV | Absence | Absence | Presence | Presence | Absence | Absence | Absence | Absence |
| | Ejection Orifice Array III | Absence | Presence | Presence | Presence | Presence | Absence | Absence | Absence |
| | Ejection Orifice Array II | Presence | Presence | Presence | Presence | Presence | Presence | Presence | Presence |
| | Ejection Orifice Array I | Presence | Presence | Presence | Presence | Presence | Presence | Presence | Presence |
| Angle (°) between Ejection Orifice Surface and Gravity Direction | | 45 | 45 | 45 | 90 | 45 | 90 | 45 | 0 |

(Color Mixing Recoverability)

First, a single color solid image (about 10 cm in the conveying direction of the recording medium×about 4 cm in the depth direction of the apparatus) having a recording duty of 100% was recorded using each of the inks. The obtained image was used as an evaluation image 1. Then, a solid image having a plurality of colors (about 29 cm in the conveying direction of the recording medium×about 4 cm in the depth direction of the apparatus) was continuously recorded on 100 sheets using each of the inks so that the recording duty of each of the inks was the same and a total recording duty of the inks was 100%. After the apparatus was left for 1 week, a solid image having a plurality of colors (about 29 cm in the conveying direction of the recording medium×about 4 cm in the depth direction of the apparatus) was continuously recorded on 100 sheets using each of the inks so that the recording duty of each of the inks was the same and a total recording duty of the inks was 100%.

After repeating a series of operations such as continuous recording, leaving, and continuous recording seven times, a single color solid image (about 10 cm in the conveying direction of the recording medium×about 4 cm in the depth direction of the apparatus) having a recording duty of 100% was recorded again using each of the ink. The obtained image was used as an evaluation image 2. As the recording medium, plain paper (PPC paper, PB paper manufactured by Canon Inc.) was used. Further, in order to record a single color solid image (about 10 cm in the conveying direction of the recording medium×about 4 cm in the depth direction of the apparatus), approximately 7000 ink droplets were ejected from one ejection orifice.

The evaluation images 1 and 2 were visually observed to evaluate when color mixing of the evaluation image 2 was eliminated after the ink was started to be ejected.

A: Color mixing was eliminated by ejecting ink within about 1,000 droplets from all of the ejection orifices.

B: Color mixing was eliminated by ejecting ink within more than about 1,000 droplets to about 5,000 droplets from all of the ejection orifices.

C: Color mixing was eliminated by ejecting ink more than about 5,000 droplets from all of the ejection orifices.

TABLE 3

Evaluation Results

| | Evaluation Conditions | | | | | | Evaluation Result |
|---|---|---|---|---|---|---|---|
| | Conveying Direction of Recording Medium | Recording Head No. | Kind of Ink of Ejection Orifice Array I | Kind of Ink of Ejection Orifice Array II | Kind of Ink of Ejection Orifice Array III | Kind of Ink of Ejection Orifice Array IV | Color Mixing Recoverability |
| Example 1 | I→II | 1 | Yellow Ink 1 | Magenta Ink 1 | — | — | A |
| Example 2 | I→II | 1 | Magenta Ink 2 | Yellow Ink 3 | — | — | A |
| Example 3 | I→II | 8 | Yellow Ink 1 | Magenta Ink 1 | — | — | A |
| Example 4 | I→II | 1 | Magenta Ink 1 | Black Ink 1 | — | — | A |
| Example 5 | I→II | 1 | Cyan Ink 1 | Black Ink 1 | — | — | A |
| Example 6 | I→II | 1 | Magenta Ink 1 | Cyan Ink 1 | — | — | A |
| Example 7 | I→II | 1 | Magenta Ink 1 | Cyan Ink 2 | — | — | A |
| Example 8 | I→II | 1 | Yellow Ink 1 | Cyan Ink 1 | — | — | A |
| Example 9 | I→II | 1 | Yellow Ink 1 | Black Ink 1 | — | — | A |
| Example 10 | I→II | 1 | Magenta Ink 1 | Black Ink 3 | — | — | A |
| Example 11 | I→II | 2 | Yellow Ink 1 | Cyan Ink 1 | Black Ink 1 | — | A |
| Example 12 | I→II | 2 | Magenta Ink 1 | Cyan Ink 1 | Black Ink 1 | — | A |
| Example 13 | I→II | 2 | Yellow Ink 1 | Magenta Ink 1 | Cyan Ink 1 | — | A |
| Example 14 | I→II | 3 | Yellow Ink 1 | Magenta Ink 1 | Cyan Ink 1 | Black Ink 1 | A |
| Example 15 | I→II | 1 | Yellow Ink 2 | Black Ink 2 | — | — | B |
| Example 16 | I→II | 1 | Yellow Ink 2 | Black Ink 1 | — | — | B |
| Example 17 | I→II | 1 | Yellow Ink 1 | Black Ink 2 | — | — | B |
| Example 18 | I→II | 1 | Yellow Ink 4 | Black Ink 4 | — | — | A |
| Example 19 | II→I | 1 | Yellow Ink 1 | Magenta Ink 1 | — | — | A |
| Comparative Example 1 | I→II | 1 | Black Ink 1 | Cyan Ink 1 | — | — | C |
| Comparative Example 2 | I→II | 1 | Black Ink 1 | Magenta Ink 1 | — | — | C |
| Comparative Example 3 | I→II | 1 | Black Ink 1 | Yellow Ink 1 | — | — | C |
| Comparative Example 4 | I→II | 1 | Cyan Ink 1 | Magenta Ink 1 | — | — | C |
| Comparative Example 5 | I→II | 1 | Cyan Ink 1 | Yellow Ink 1 | — | — | C |
| Comparative Example 6 | I→II | 1 | Magenta Ink 1 | Yellow Ink 1 | — | — | C |
| Comparative Example 7 | I→II | 8 | Magenta Ink 1 | Yellow Ink 1 | — | — | C |
| Comparative Example 8 | I→II | 2 | Black Ink 1 | Yellow Ink 1 | Cyan Ink 1 | — | C |
| Comparative Example 9 | I→II | 3 | Black Ink 1 | Yellow Ink 1 | Magenta Ink 1 | Cyan Ink 1 | C |
| Reference Example 1 | I→II | 4 | Yellow Ink 1 | Magenta Ink 1 | Cyan Ink 1 | Black Ink 1 | A |
| Reference Example 2 | I→II | 4 | Black Ink 1 | Cyan Ink 1 | Magenta Ink 1 | Yellow Ink 1 | A |
| Reference Example 3 | I→II | 1 | Yellow Ink 1 | Yellow Ink 1 | — | — | A |
| Reference Example 4 | I→II | 5 | Yellow Ink 1 | — | Magenta Ink 1 | — | A |
| Reference Example 5 | I→II | 6 | Yellow Ink 1 | Magenta Ink 1 | — | — | A |
| Reference Example 6 | I→II | 6 | Magenta Ink 1 | Yellow Ink 1 | — | — | A |

TABLE 3-continued

Evaluation Results

| | | Evaluation Conditions | | | | | |
|---|---|---|---|---|---|---|---|
| | Conveying Direction of Recording Medium | Recording Head No. | Kind of Ink of Ejection Orifice Array I | Kind of Ink of Ejection Orifice Array II | Kind of Ink of Ejection Orifice Array III | Kind of Ink of Ejection Orifice Array IV | Evaluation Result Color Mixing Recoverability |
| Reference Example 7 | I→II | 7 | Yellow Ink 1 | Magenta Ink 1 | — | — | A |
| Reference Example 8 | I→II | 7 | Magenta Ink 1 | Yellow Ink 1 | — | — | A |
| Reference Example 9 | I→II | 2 | Yellow Ink 1 | Black Ink 1 | Cyan Ink 1 | — | C |
| Reference Example 10 | I→II | 3 | Yellow Ink 1 | Black Ink 1 | Magenta Ink 1 | Cyan Ink 1 | C |
| Reference Example 11 | I→II | 3 | Yellow Ink 1 | Magenta Ink 1 | Black Ink 1 | Cyan Ink 1 | C |

As Reference Example 12, an image was recorded using an ink jet recording apparatus including two recording heads corresponding to magenta ink 1 and yellow ink 1 sequentially from an upstream side in the conveying direction of the recording medium. As a result of recording the image using the same method as in Comparative Example 6 except for using two recording heads, color mixing recoverability was evaluated as rank A, corresponding to the acceptable level.

As Reference Example 13, an image was recorded using an ink jet recording apparatus including two recording heads corresponding to yellow ink 1 and magenta ink 1 sequentially from an upstream side in the conveying direction of the recording medium. As a result of recording the image using the same method as in Example 1 except for using two recording heads, color mixing recoverability was evaluated as rank A, corresponding to the acceptable level.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-201261, filed Oct. 17, 2017, and Japanese Patent Application No. 2018-180360, filed Sep. 26, 2018, which are hereby incorporated by reference herein in their entirety.

What is claimed is:

1. An ink jet recording method using an ink jet recording apparatus that includes (i) a first ink and a second ink that are each aqueous inks comprising a pigment, and (ii) a recording head having an ejection orifice surface in which a first ejection orifice array for ejecting the first ink and a second ejection orifice array for ejecting the second ink are formed, wherein the first ejection orifice array and the second ejection orifice array are sequentially arranged from a bottom in a direction of gravity to be adjacent to each other and arranged to at least partially overlap each other in a conveying direction of a recording medium, the ink jet recording method comprising:
a recording step of ejecting an aqueous ink from the recording head disposed so that an angle formed between the ejection orifice surface of the recording head and the direction of gravity is 0° or more to less than 90° to record an image on the recording medium,
wherein a true specific gravity of the pigment in the first ink is smaller than a true specific gravity of the pigment in the second ink.

2. The ink jet recording method according to claim 1, wherein a third ejection orifice array for ejecting a third ink that is an aqueous ink comprising a pigment is further arranged at a position adjacent to the second ejection orifice array of the recording head,
wherein the second ejection orifice array and the third ejection orifice array are arranged to at least partially overlap each other in the conveying direction of the recording medium, and
wherein a true specific gravity of the pigment in the second ink is smaller than a true specific gravity of the pigment in the third ink.

3. The ink jet recording method according to claim 2, wherein a fourth ejection orifice array for ejecting a fourth ink that is an aqueous ink comprising a pigment is further arranged at a position adjacent to the third ejection orifice array of the recording head,
wherein the third ejection orifice array and the fourth ejection orifice array are arranged to at least partially overlap each other in the conveying direction of the recording medium, and
wherein a true specific gravity of the pigment in the third ink is smaller than a true specific gravity of the pigment in the fourth ink.

4. The ink jet recording method according to claim 1, wherein the aqueous ink comprises a first water-soluble organic solvent having a relative dielectric constant of 20.0 or more.

5. The ink jet recording method according to claim 1, wherein the recording head includes a single recording element substrate in which the first ejection orifice array and the second ejection orifice array are arranged.

6. The ink jet recording method according to claim 5, wherein the recording head includes a plurality of the recording element substrates.

7. The ink jet recording method according to claim 6, wherein the plurality of recording element substrates included in the recording head are arranged to be adjacent in an arrangement direction of the first ejection orifice array and the second ejection orifice array.

8. The ink jet recording method according to claim 1, wherein the angle formed between the ejection orifice surface of the recording head and the direction of gravity is 10° or more to 80° or less.

9. The ink jet recording method according to claim 1, wherein the angle formed between the ejection orifice surface of the recording head and the direction of gravity is 30° or more to 60° or less.

10. The ink jet recording method according to claim 1, wherein the conveying direction of the recording medium is from the first ejection orifice array to the second ejection orifice array.

11. The ink jet recording method according to claim 1, wherein the ejection orifice surface is subjected to a water-repellent treatment.

12. The ink jet recording method according to claim 1, wherein the pigment comprises at least one pigment selected from the group consisting of carbon black, titanium oxide, azo, phthalocyanine, quinacridone, isoindolinone, imidazolone, diketopyrrolopyrrole, and dioxazine.

13. An ink jet recording apparatus comprising:
(a) a first ink and a second ink that are each aqueous inks comprising a pigment; and
(b) a recording head having an ejection orifice surface in which a first ejection orifice array for ejecting the first ink and a second ejection orifice array for ejecting the second ink are formed, wherein the first ejection orifice array and the second ejection orifice array are sequentially arranged from a bottom in a direction of gravity to be adjacent to each other and arranged to at least partially overlap each other in a conveying direction of a recording medium, wherein an aqueous ink is ejected from the recording head that is disposed so that an angle formed between the ejection orifice surface of the recording head and the direction of gravity is 0° or more to less than 90° to record an image on the recording medium, and wherein a true specific gravity of the pigment in the first ink is smaller than a true specific gravity of the pigment in the second ink.

* * * * *